Patented Apr. 7, 1953

2,634,247

UNITED STATES PATENT OFFICE 2,634,247

PROCESS FOR MAKING RESIN FOR WET STRENGTH PAPER

Glenn A. Nesty and Harry E. Gronich, Morristown, N. J., assignors to Allied Chemical & Dye Corporation, New York, N. Y., a corporation of New York No Drawing. Application October 6, 1951, Serial No. 250,193

6 Claims. (Cl. 260—29.4)

This invention relates to a process for the production of an aqueous solution of a urea-formaldehyde condensation product of such character that it is selectively adsorbable from aqueous solution by cellulose fibers, and is particularly suitable for use in treating such fibers which are made into paper, to give a high wet strength to the paper. The invention is particularly directed also to the production of paper by treating the paper fibers with the urea-formaldehyde condensation products produced in accordance with the methods described herein. Our invention further extends to the solutions of condensation products produced by our novel process.

Processes for the production of water-soluble urea-formaldehyde condensation products or resins have heretofore been known. It has also been known that by treating slurries of cellulose fibers present in certain stages of the paper making process with solutions of certain of those water-soluble urea-formaldehyde condensation products or resins prepared under carefully controlled conditions, the resin is adsorbed by the cellulose fibers. By heating the paper made from the thus treated fibers to cure the adsorbed resin, both the dry and wet strengths of the paper are increased. The increase in wet strength of the paper is particularly important inasmuch as paper, when wet, ordinarily retains only a very small fraction of its strength when dry.

As is well known in reacting urea and formaldehyde in aqueous solutions to form condensation products thereof, depending upon the reaction conditions, water-soluble or crystalline or amorphous, insoluble products are produced. Most of these materials, including many of the water-soluble products, are of no use for the treatment of paper pulps; not being adequately adsorbed by the paper fibers or, if deposited in or on the fibers, not imparting to the final paper product a sufficient increase in dry or wet strength to make the use of those condensation products economic. Furthermore, solutions of many of the water-soluble condensation products are unstable in the sense that the urea and formaldehyde continue to react when stored at atmospheric temperatures, the soluble constituents being converted into insoluble gels or precipitates which are unsatisfactory for the treatment of paper pulps. Thus, while the prior art describes a multitude of procedures for the production of various condensation products of urea and formaldehyde, only a very few methods give water-soluble products which are usable for treatment of paper pulp and these require a close control of numerous reaction conditions during the reaction of the formaldehyde and urea.

The copending application of Harry E. Gronich, Serial No. 195,423, filed November 13, 1950, describes a process for the production of stable aqueous solutions of a urea-formaldehyde condensation product selectively adsorbable from acidic aqueous solution by cellulose fibers, which condensation products have properties making them particularly useful for the production of high wet strength papers. The process of that application involves:

1. Mixing and initially reacting urea and formaldehyde in an aqueous solution containing an acidic buffer salt and maintained at temperatures in the range 10° C. to 35° C. and at acidities in the range pH 4.5 to 6.9, the initial mol ratio of urea and formaldehyde in the reaction mixture being in the range 1.65 to 3 mols formaldehyde to one mol urea. The reaction mixture is maintained at 10° C. to 35° C. for a period of at least one hour.

2. Thereafter, the liquid product of step 1 is heated to temperatures above 50° C. and maintained at those temperatures and at acidities in the range pH 4.5 to 6.5 until the precipitation time of the reaction time test set forth in that application is substantially at its minimum value for the reaction mixture being treated. At this time the reaction mixture is cooled to atmospheric temperatures to arrest the condensation reactions taking place in this second step of the process.

When a formaldehyde solution containing about 0.03% or more free formic acid is employed as a starting material it is preferred to use as the buffer salt zinc formate incorporated in the formaldehyde solution by adding to the solution an excess of zinc dust over the amount required to react with the formic acid to form zinc formate buffer salt. The presence of excess undissolved zinc in contact with the reaction mixture appears to promote formation of a resin product which imparts high wet strengths to paper made from cellulose fibers treated with that product. However, this excess zinc should not be kept suspended in the reaction mixture. After solid urea has been dissolved in the formaldehyde solution or after a solution of urea has been mixed with the aqueous formaldehyde, in stirring the reaction mixture during the precondensation and subsequent condensation reaction period, the rate of stirring should be insufficient to suspend unreacted finely divided zinc present in the reaction mixture. If more than 10 minutes is required for dissolving the urea or mixing a concentrated urea solution with the formaldehyde solution, the stirring of the mixture should be carried out under conditions permitting zinc particles present to settle out of the reaction mixture within a period of 10 minutes from the initial addition of the urea to the formaldehyde solution. In other words, promptly after the urea has been dispersed in the formaldehyde solution or within a period of about 10 minutes after addition of urea to the formaldehyde solution, whichever period is shorter, agitation of the reaction mixture should be insufficient to maintain in suspension any zinc present. A slow stirring is generally desirable during the precondensation and during the following condensation period.

When the condensation step of the described process is carried out at or below the boiling point of the reaction mixture, the condensation reaction proceeds relatively slowly, requiring several hours or more to go to the stage at which the desired product is obtained.

The present invention is directed to an improvement in the process of said application Serial No. 195,423 of Harry E. Gronich. We have now discovered that if the second step, the condensation step, is carried out by quickly heating the reaction mixture to temperatures substantially above its boiling point at atmospheric pressure, and while thus highly heating the reaction mixture, maintaining it under pressures at least as high as those autogenously developed by the reaction mixture, and then quickly cooling the reaction mixture to room temperatures, the desired product may be obtained with short reaction periods in this step and without side reactions promoted by the higher temperatures destroying or seriously impairing the effectiveness of the product for making high wet strength paper.

To attain these objectives in carrying out the process of our present invention, the reaction mixture being treated in the condensation step of the process described in the above-identified application of Harry E. Gronich is quickly heated from the temperatures of 10°–35° C. at which it is maintained during the precondensation step to temperatures above 100° C. but not above 165° C., preferably to temperatures above 120° C. but not above 150° C. and is quickly cooled to temperatures below 85° C. to arrest progress of the condensation reactions. The further cooling of the reaction product to atmospheric temperatures may be also carried out quickly or may be over a much longer time than that involved in the heating to the high reaction temperature and cooling to below 85° C. It is best, however, that the cooling to atmospheric temperatures follow without prolonged delay the cooling to below 85° C. By quickly heating and quickly cooling the reaction mixture, we mean that it is heated to a temperature in the range above 100° C. to not above 165° C. and is cooled to not above 85° C. in a period no longer than 30 minutes, preferably is heated to 120° C. to 150° C. and cooled to not above 85° C. in no more than 20 minutes.

The reaction mixture need be at temperatures above 100° C. for only a short time for the condensation reactions to go to the desired extent. Minimum times of 1 minute at temperatures above 120° C. and of 2 minutes at temperatures above 100° C. when the reaction mixture is heated no higher than 120° C., are sufficient irrespective of the rapidity of heating the reaction mixture to above 100° C. and cooling it to not above 85° C. These minimum times during which the reaction mixture is at temperatures above 100° C. are included in the aforedescribed periods within which the reaction mixture is quickly heated and cooled. While being heated to the high temperatures above its boiling point, the reaction mixture is maintained under pressures at least as great as those autogenously developed at the temperatures to which the reaction mixture is heated to prevent loss from the reaction mixture of substantial amounts of reactants. Under the foregoing conditions we have found stable solutions of urea-formaldehyde reaction product are obtained which impart high wet strengths to paper.

Other than time, temperature and pressure for carrying out the second step, the reaction conditions of acidity and composition of reaction mixture, the conditions under which it is subjected to the first (precondensation) step and treatment of the product of the second (condensation) step prior to its storage or use in paper making, are the same as for the process described in said application of Harry E. Gronich.

In operating in accordance with our invention, the heating and cooling of the reaction mixture are carried out rapidly, in order both to suitably control the time of the reaction period (and thereby the degree of condensation of the urea-formaldehyde) and to minimize hydrolysis of the urea. Once the reaction mixture has been cooled to below 85° C., further condensation of the urea-formaldehyde takes place so slowly that a relatively slow cooling to atmospheric temperatures may be employed.

Solutions of condensation product prepared by the processes of our invention are stable for long periods of time at atmospheric temperatures without gelation or deposition of solids therefrom and are thus suitable for production and marketing for use in paper manufacture. The stability of the solutions may be increased whenever desired by adding an alkali, such as sodium hydroxide, to neutralize the free acidity of the solution and to reduce its hydrogen ion concentration to a pH of 7 or slightly higher, i. e. 7–7.5.

The presence of methanol in the solution of reaction product prepared in any of the described manners further increases the storage life of the solution. About 2½% or more methanol by weight of the reaction product is sufficient to materially increase the storage life. When methanol is to be present, we prefer the products contain 5% methanol and practical considerations of the cost of added methanol and dilution of the reaction product will limit the methanol addition to a minor amount, not greatly exceeding this preferred 5%. The commercial "inhibited" formalin solutions on the market usually contain about 6% to 13% methanol to serve as a preservative for the formaldehyde solution during shipment and storage. In general, this quantity of methanol in the formaldehyde solution used for making up the reaction mixture will result in the reaction product containing an adequate methanol concentration without the addition of more methanol to that product.

As described in said application of Harry E. Gronich, instead of neutralizing the product following the condensation step at high temperatures, it may be stored at atmospheric temperatures for a period of time to age it and to increase the wet strength of paper prepared from fibers treated with such aged solutions. By neutralizing the aged solutions their stability is increased and the time during which they may be held further at atmospheric temperatures before use in paper production is substantially longer.

Also, when aqueous solutions of formaldehyde containing major amounts of water such as the commercial 37% by weight formaldehyde solutions are employed in making up the reaction mixture, it may be and frequently is desirable to eliminate at least a part of this water so that the final product will contain a relatively high concentration of solids. By neutralizing the acidity of the reaction product of the high temperature condensation stage of the process described above, the neutralized aqueous products having acidities in the range pH 7.0 to 7.5 can be boiled to evaporate water therefrom at atmospheric pressure without seriously impairing the storage life during which the product solution can be held without gelling or precipitation, and without substantially decreasing the wet strength imparted to paper by treatment with the concentrated product. However, when the product solution neutralized to 7.0-7.5 is evaporated far enough for the pH of the solution to drift below 7.0 downwardly to 6.0, the desired quantity of water should be evaporated from the solution sufficiently rapidly so that the solution having acidities in this range of 6.0 to below 7.0 is heated to evaporate it for a period no longer than two hours.

In employing the solutions of urea-formaldehyde condensation products to make high wet strength paper, the solution is added to a water suspension of cellulose fibers which, either before or after the addition of the resin is made acidic by addition of an acid or acidic material such as the alum commonly added to the pulp slurries in paper making processes. Thus, the resin solution may be added to the fiber suspension in the beater or head box commonly employed in paper manufacture. The amount of resin solution used is determined by the properties to be imparted to the paper; more or less resin solution being used, depending upon economics and the increase in wet or dry strength desired for the paper. The urea-formaldehyde condensate is preferentially adsorbed from solution by the cellulose fibers. Addition to the fiber suspension of resin solution containing a fraction of a percent up to 2½% by weight of solids content of the solution based on the dry weight of the cellulose fibers present, increases sharply the wet strength of the resulting paper. In general, however, further increases above 2½% in the amount of urea-formaldehyde resin added do not give comparable increases in the wet strength of the paper product. In addition to the more important consideration of increase in wet strength of the paper, the addition of the resin also increases materially the dry strength of paper.

The effectiveness of the resin in improving wet strength of paper is cut down when the water in the suspension of cellulose fibers has a high bicarbonate content, e. g. of around 100 p. p. m. or more. When the water available to the paper manufacturer has a hardness of this nature, addition of a water softening agent, such as sodium hexa-metaphosphate, will obviate this reduction in effectiveness of the treatment of the fibers with the solutions of urea-formaldehyde resin. Instead of reducing the hardness of the water, adding to it an acid or acidic material in amount sufficient to increase its hydrogen ion concentration to a pH of about 4.0 to about 4.2 will also restore the effectiveness of the resin solution in increasing the wet strength of the paper.

The fiber pulp containing the adsorbed urea-formaldehyde condensation product is sheeted by the usual methods employed by paper manufacturers. The paper is dried and heated to cure the resin. The time required for adequate curing of the resin decreases as the temperature of heating is increased. Adequate rates of curing are obtained by heating the paper at temperatures in the range 100° to 150° C.

The following examples more particularly illustrate our process for the production of solutions of urea-formaldehyde condensation products. In employing the product solutions of these examples for making paper, Kraft pulp was beaten with water to form a slurry to which the resin solution was added in amount providing 2½% of resin by weight of dry pulp. The slurry was agitated 15 minutes and a 10% solution of papermaker's alum added to lower the pH of the slurry to about 4.5. After a further agitation for 5 minutes the pulp slurry was made into sheets of paper which were dried at 60° C. and then cured at 130° C. for 5 minutes under pressure. Samples of paper thus prepared and paper prepared in the same manner except for no resin solution being added to the pulp slurry were conditioned 24 hours at 75° F. and 50% relative humidity and then tested for dry and wet tensile strengths. The tensile strength tests were made on a Scott I.P.-4, inclined plane constant rate of load machine, using ½" wide samples both for wet and dry tests. The test data are given in terms of kg./gm. wt. of a strip of paper 10 cm. long and ½" wide. For wet strength test ½" sample strips were soaked 60 seconds in distilled water, then placed between two blotters. A steel cylinder 3" long weighing 3 kg. was rolled across the blotters and test strip under its own weight and the paper strip was tested immediately.

For comparison with the values given in the following examples for the wet strengths of papers made in the manner described, the wet tensile strengths of paper prepared in the same manner except that no urea-formaldehyde reaction product was added to the pulp slurry, were 3½-5 kg./gm. wt.

*Example 1.*—Into a vessel equipped with an agitator, 199 parts of 36.0% commercial formaldehyde solution containing 10-11% methanol and .03% formic acid was charged. To this was added .085 part zinc dust, and the solution was strongly agitated until the pH increased to 6.15. There was then added 57.3 parts of solid urea, with strong agitation to obtain rapid solution of the urea. This corresponded to a ratio of 2.5 mols formaldehyde for 1 mol urea. When the urea had dissolved the agitation was slowed down and the reaction mixture was stirred slowly at 20-25° C. (room temperature) for three hours. Following the precondensation period the reaction mixture was transferred into a bomb, sealed, then immersed in an oil bath preheated to 220° C. After 12½ minutes in the oil bath, the bomb was removed and immediately quenched in a cold water bath. During the period in the hot oil the temperature of the bomb contents rose from about 25° C. to 140° C. with development of 90 p. s. i. gauge pressure in a period of 12½ minutes. In the cold water bath the bomb contents were cooled to below 85° C. in about 4 minutes and to 20–25° C. in 15 minutes.

The solution of urea-formaldehyde condensation product thus prepared is clear and mobile and has a pH of about 4.6. It is stable when stored at atmospheric temperatures over long periods of time even without being neutralized. When this solution was employed in making paper by the procedure described above, the paper had a wet strength of 25 kg./gm. wt.

*Example 2.*—The same procedure described in Example 1 was carried out except that the bomb containing the reaction mixture was immersed in the oil bath for 20 minutes before being withdrawn and cooled in the cold water bath. In this case the temperature in the bomb rose from 24° to a maximum of 165° C. during the period of 20 minutes immersion in the oil bath. At the end of the 20 minute heating up period the pressure in the bomb was 325 p. s. i. gauge. In the water bath the bomb contents were cooled to a temperature below 85° C. in a period of less than 10 minutes.

The product thus obtained had a pH of 5.9 and contained some white precipitate which readily settled out. The clear, liquid solution of urea-formaldehyde condensation product was stable at atmospheric temperatures over a long period of time and paper prepared with this resin in the manner described above had a wet strength of 11.3 kg./gm. wt.

Employing the same procedure except for immersion of the bomb containing the reaction mixture in an oil bath for 12 minutes, during which period the temperature of the bomb contents rose from 26° C. to 153° C., followed by immersion of the bomb in the cold water bath, a stable solution of urea-formaldehyde reaction product was obtained having a pH of 4.8. This product imparted to paper prepared in the manner described above a wet strength of 18.6 kg./gm. wt.

We claim:

1. In a process for the production of a stable, aqueous solution of a urea-formaldehyde condensate selectively adsorbable from acidic aqueous solution by cellulose fibers which comprises (1) maintaining for a period of at least one hour at temperatures in the range 10° C. to 35° C. an aqueous solution initially containing formaldehyde and urea in the mol ratio of 1.65 to 3 mols formaldehyde for every 1 mol urea and an acidic buffer salt and maintaining the hydrogen ion concentration of said solution within the range pH 4.5 to 6.9, said solution having been prepared by mixing the urea with the formaldehyde in an aqueous solution having a pH within the aforesaid range; (2) then heating the thus treated reaction mixture to temperatures above 50° C. and maintaining it at acidities in the range pH 4.5 to 6.5 to cause further condensation of the urea and formaldehyde; and (3) cooling the thus heated liquid reaction mixture to atmospheric temperatures and thus arresting the condensation reactions; the improvement which comprises in step 2 quickly heating the reaction mixture to temperatures in the range above 100° C. to no higher than 165° C. under pressures at least as great as those autogenously developed at those temperatures and in step 3 quickly cooling the thus heated reaction mixture to a temperature no higher than 85° C., said heating and cooling of the reaction mixture being accomplished in a period no longer than 30 minutes, including a minimum of 1 minute during which the reaction mixture is at temperatures above 120° C. and when the reaction mixture is heated to no higher than 120° C., a minimum of 2 minutes during which it is at temperatures above 100° C.

2. The process of claim 1 wherein in step 2 the reaction mixture is quickly heated to temperatures in the range above 120° C. to 150° C., and in steps 2 and 3 the heating and cooling of the reaction mixture is accomplished in a period no longer than 20 minutes, including a minimum of 1 minute during which the reaction mixture is at temperatures above 120° C.

3. In a process for the production of a stable, aqueous solution of a urea-formaldehyde condensate selectively adsorbable from acidic aqueous solution by cellulose fibers which comprises (1) mixing with an aqueous formaldehyde solution containing at least 0.03% free formic acid, zinc dust in amount in excess of that required to form zinc formate with the free formic acid present, agitating the mixture of solution and zinc dust until the zinc has reacted with a substantial proportion of the formic acid and the pH of the solution is above 4.5; (2) thereafter adding to and dispersing in the formaldehyde solution urea in amount providing 1 mol of urea for every 1.65 to 3 mols formaldehyde present, promptly after dispersal of the urea in the formaldehyde solution and within 10 minutes of the initial addition of the urea to the solution, separating out from suspension in the solution undissolved zinc suspended therein; (3) maintaining the thus prepared reaction mixture for a period of at least one hour at temperatures in the range 10° C. to 35° C. and at hydrogen ion concentrations in the range pH 4.5 to 6.9; (4) then heating the thus treated reaction mixture to temperatures above 50° C. and maintaining it at acidities in the range pH 4.5 to 6.5 to cause further condensation of the urea and formaldehyde; and (5) cooling the thus heated liquid reaction mixture to atmospheric temperatures and thus arresting the condensation reactions; the improvement which comprises in step 4 quickly heating the reaction mixture to temperatures in the range above 100° C. to no higher than 165° C. under pressures at least as great as those autogenously developed at those temperatures and in step 5 quickly cooling the thus heated reaction mixture to a temperature no higher than 85° C., said heating and cooling of the reaction mixture being accomplished in a period no longer than 30 minutes, including a minimum of 1 minute during which the reaction mixture is at temperatures above 120° C., and when the reaction mixture is heated to no higher than 120° C., a minimum of 2 minutes during which it is at temperatures above 100° C.

4. The process of claim 3 wherein 1 mol of urea for every 2 to 3 mols of formaldehyde are added in step 2, in step 4 the liquid product of step 3 is heated to temperatures in the range above 120° C. to 150° C., and in steps 4 and 5 the heating and cooling of the reaction mixture are accomplished in a period no longer than 20 minutes, including a minimum of 1 minute during which the reaction mixture is at temperatures above 120° C.

5. A stable aqueous solution of a urea-formaldehyde condensation product selectively adsorbable from acidic aqueous solution by cellulose fibers, which condensate product has been produced by the process of claim 1.

6. A stable aqueous solution of a urea-formaldehyde condensation product selectively adsorbable from acidic aqueous solution by cellulose fibers which condensate product has been produced by the process of claim 4.

GLENN A. NESTY.
HARRY E. GRONICH.

REFERENCES CITED

The following references are of record in the file of this patent:

UNITED STATES PATENTS

| Number | Name | Date |
|---|---|---|
| 2,338,602 | Schur | Jan. 4, 1944 |
| 2,559,220 | Maxwell et al. | July 3, 1951 |

FOREIGN PATENTS

| Number | Country | Date |
|---|---|---|
| 467,505 | Canada | Aug. 22, 1950 |